United States Patent
Kim et al.

(10) Patent No.: US 7,455,409 B2
(45) Date of Patent: Nov. 25, 2008

(54) PROJECTION-TYPE IMAGE DISPLAY APPARATUS

(75) Inventors: Su-gun Kim, Hwaseong-gun (KR); Dae-sik Kim, Suwon-si (KR); Kye-hoon Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 414 days.

(21) Appl. No.: 11/154,624

(22) Filed: Jun. 17, 2005

(65) Prior Publication Data
US 2006/0033886 A1 Feb. 16, 2006

Related U.S. Application Data

(60) Provisional application No. 60/599,865, filed on Aug. 10, 2004.

(30) Foreign Application Priority Data
Nov. 3, 2004 (KR) .................. 10-2004-0088980

(51) Int. Cl.
*G03B 21/26* (2006.01)
*G03B 21/28* (2006.01)
(52) U.S. Cl. .............. 353/37; 353/94; 353/99
(58) Field of Classification Search .......... 353/20, 353/30, 31, 33, 34, 37, 78, 94, 98, 99, 102, 353/122; 362/26, 551; 385/146, 901; 349/5, 349/7–9; 359/291, 726
See application file for complete search history.

(56) References Cited

U.S. PATENT DOCUMENTS 6,324,330 B1 * 11/2001 Stites .................. 385/133
6,481,852 B2 * 11/2002 Osaka .................. 353/31
7,261,422 B2 * 8/2007 Lin .................... 353/33
7,267,441 B2 * 9/2007 Lee et al. ............. 353/31

(Continued)

FOREIGN PATENT DOCUMENTS

JP          11-281947          10/1999

(Continued)

OTHER PUBLICATIONS

KR Office Action dated May 29, 2006 issued in KR 2004-88980.

*Primary Examiner*—Melissa Jan Koval
(74) *Attorney, Agent, or Firm*—Stanzione & Kim, LLP (57) ABSTRACT

A projection-type image display apparatus using a light emitting diode light source including a compact optical arrangement. The projection-type image display apparatus includes an illumination optical system including a light emitting diode light source to produce light and emit the light produced in one direction, a uniform light illumination unit disposed along a first optical path to change a propagation direction of the light emitted from the illumination optical system and to emit uniform light, a display device to form an image from the light emitted from the uniform light illumination unit, and a projection optical system disposed along a second optical path to enlarge and project the image formed by the display device onto a screen, wherein the first optical path along which the uniform light illumination unit is disposed and the second optical path along which the projection optical system is disposed are parallel or substantially parallel to each other.

19 Claims, 5 Drawing Sheets

U.S. PATENT DOCUMENTS

| | | | | |
|---|---|---|---|---|
| 2001/0048562 A1* | 12/2001 | Bartlett et al. | | 359/636 |
| 2002/0176146 A1* | 11/2002 | De Vaan | | 359/242 |
| 2003/0007132 A1* | 1/2003 | Shouji | | 353/30 |
| 2003/0202259 A1* | 10/2003 | Nishimae et al. | | 359/726 |
| 2005/0084210 A1* | 4/2005 | Cha | | 385/31 |

FOREIGN PATENT DOCUMENTS

| | | |
|---|---|---|
| JP | 2000-89362 | 3/2000 |
| JP | 2002-72083 | 3/2002 |
| JP | 2002-268143 | 9/2002 |
| JP | 2003-330107 | 11/2003 |
| JP | 2004-46026 | 2/2004 |
| JP | 2004-102132 | 4/2004 |
| KR | 2002-55294 A | 7/2002 |

\* cited by examiner

PROJECTION-TYPE IMAGE DISPLAY APPARATUS

CROSS-REFERENCE TO RELATED APPLICATIONS

This application claims priority from U.S. Provisional Patent Application No. 60/599,865, filed on Aug. 10, 2004, in the U.S. Patent and Trademark Office, and priority from Korean Patent Application No. 2004-88980, filed on Nov. 3, 2004, in the Korean Intellectual Property Office, the disclosures of which are incorporated herein by reference in their entirety.

BACKGROUND OF THE INVENTION

1. Field of the Invention

The present general inventive concept relates to a projection-type image display apparatus that uses a light emitting diode (LED) light source, and more particularly, to a projection-type image display apparatus including a compact optical arrangement.

2. Description of the Related Art

In general, projection-type image display apparatuses provide an image by projecting an image formed on a display device onto a screen using light emitted from a light source. To realize compact projection-type image display apparatuses with a wide screen, a light emitting diode (LED) is used as the light source. If the LED is used as the light source, an illumination system can be made compact and a natural color image can be easily obtained because of the characteristics of the LED. Further, the LED has greater durability than a lamp that produces light through an arc discharge, and can operate at low power.

The LED produces a low light output. In the projection-type image display apparatuses with a wide screen, a plurality of LEDs should be used as light sources. An illumination system that emits light from the plurality of LEDs to a projection lens system typically requires a large configuration, thereby making it difficult to achieve a compact design.

Figure 1:
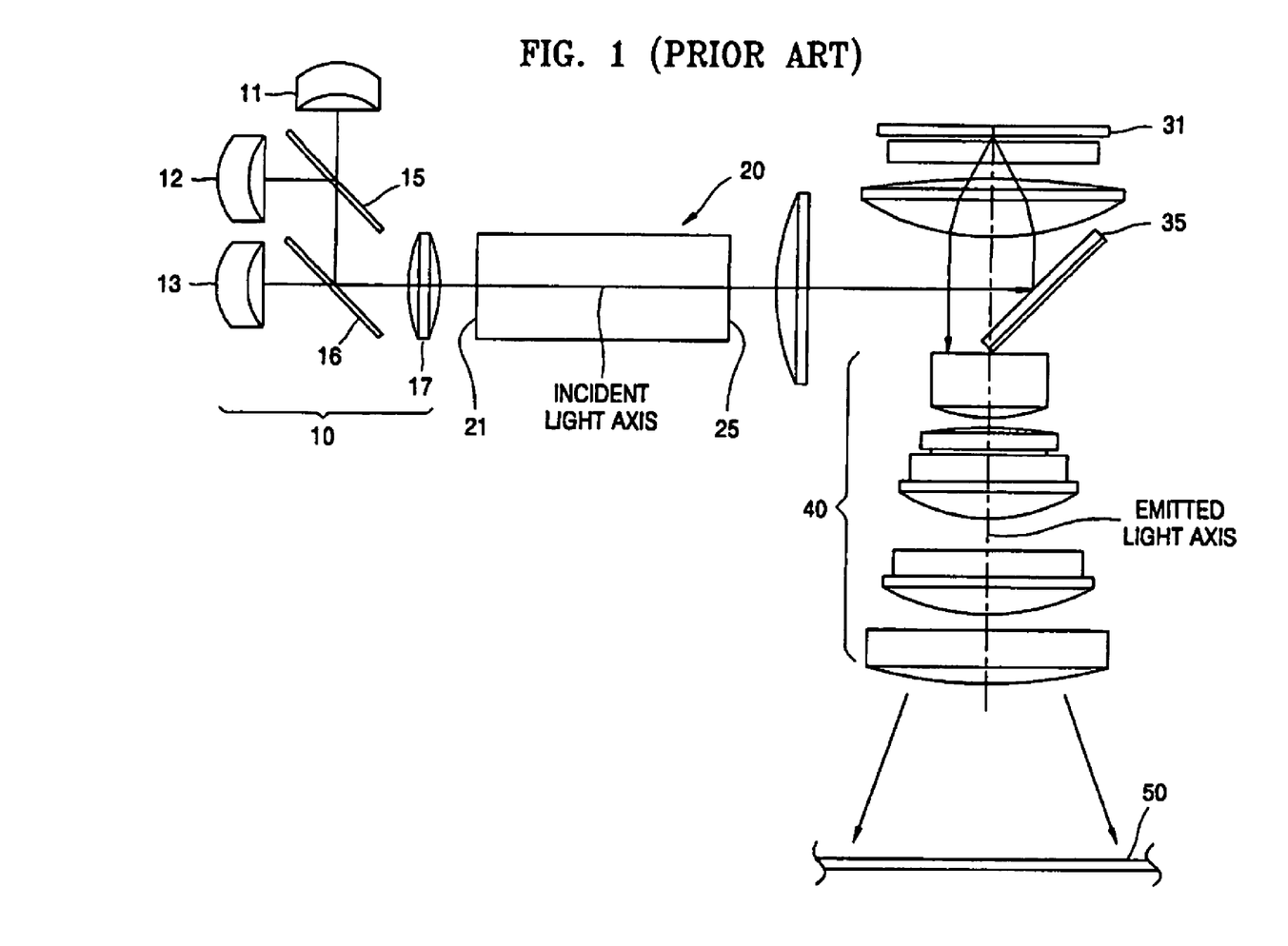
FIG. 1 is a schematic diagram illustrating an optical arrangement of a conventional projection-type image display apparatus.

Referring to FIG. 1, a conventional projection-type image display apparatus includes an illumination optical system 10 emitting a beam of a predetermined color, a glass rod 20 mixing incident light and making the incident light uniform, a display device 31 producing an image, a reflecting mirror 35 reflecting light emitted from the illumination optical system 10 to be directed toward the display device 31, and a projection optical system 40 projecting the image produced by the display device 31 onto a screen 50.

The illumination optical system 10 includes first through third LED light sources 11, 12, and 13, respectively, emitting blue light, red light, and green light. The illumination optical system 10 further includes first and second dichroic mirrors 15 and 16 disposed between the first and second LED light sources 11 and 12 and between the second and third LED light sources 12 and 13, respectively. The first and second dichroic mirrors 15 and 16 combine the blue light, red light, and green light to propagate along the same path, and a condensing lens 17 condenses the incident light.

The glass rod 20 includes an entrance surface 21 and an exit surface 25 through which light enters and exits, respectively. The glass rod 20 has a rectangular shape having a length between the entrance surface 21 and the exit surface 25 that is greater than a diagonal length of the entrance surface 21. As illustrated in FIG. 1, the glass rod 20 is longitudinally disposed along an incident light axis in a width direction (i.e., a horizontal direction when seen from FIG. 1) of the conventional projection-type image forming apparatus.

The projection optical system 40 is disposed on an emitted light axis to enlarge and project an incident image. As illustrated in FIG. 1, the incident light axis on which the glass rod 20 is disposed and the emitted light axis on which the projection optical system 40 is disposed intersect each other at a right angle.

Since the glass rod 20 is longitudinally disposed along the incident light axis, a space occupied by the glass rod 20 is large. Consequently, the projection-type image display apparatus constructed as above has a limitation in reducing its entire width.

SUMMARY OF THE INVENTION

The present general inventive concept provides a projection-type image display apparatus, which can be made compact even though the display apparatus includes a light emitting diode (LED) light source and a glass rod or an optical tunnel integrator.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a projection-type image display apparatus, comprising an illumination optical system including a light emitting diode light source to produce light and emit the light produced in one direction, a uniform light illumination unit disposed along a first optical path to change a propagation direction of the light emitted from the illumination optical system and to emit uniform light, a display device to form an image from the uniform light emitted from the uniform light illumination unit, and a projection optical system disposed along a second optical path to enlarge and project the image formed by the display device onto a screen, wherein the first optical path along which the uniform light illumination unit is disposed and the second optical path along which the projection optical system is disposed are parallel or substantially parallel to each other.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
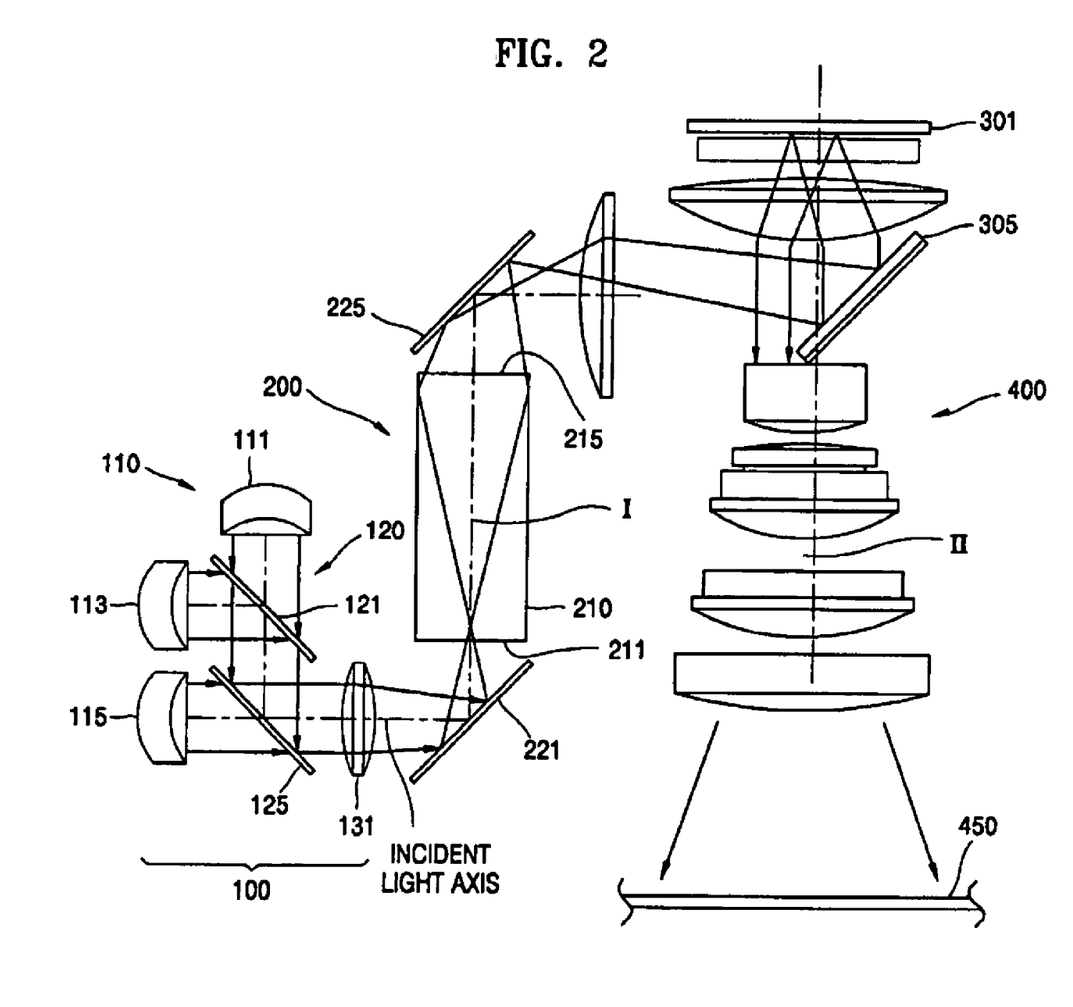
FIG. 2 is a schematic diagram illustrating an optical arrangement of a projection-type image display apparatus according to an embodiment of the present general inventive concept.

Referring to FIG. 2, a projection-type image display apparatus according to an embodiment of the present general inventive concept includes an illumination optical system 100 to emit light of a predetermined color, a uniform light illumination unit 200 to change a propagation path of the light and to emit uniform light, a display device 301 to form an image from the uniform light emitted from the uniform light illumination unit 200, and a projection optical system 400 to project the image formed by the display device 301 onto a screen 450.

The illumination optical system 100 includes a light emitting diode (LED) light source 110 to produce and emit light of a predetermined wavelength, and a synthesis unit 120 to synthesize the light emitted from the LED light source 110. The LED light source 110 may include first, second, and third LED light sources 111, 113, and 115 to respectively emit blue light, red light, and green light. The synthesis unit 120 is disposed between the first, second, and third LED light sources 111, 113, and 115 to synthesize the blue light, red light, and green light, and cause the synthesized light to propagate along the same path, for example, an incident light axis. The synthesis unit 120 includes a first dichroic mirror 121 to synthesize the blue light and the red light emitted from the first and second LED light sources 111 and 113, and a second dichroic mirror 125 to synthesize the synthesized blue and red light from the first dichroic mirror 121 and the green light emitted from the third LED light source 115. The illumination optical system 100 further includes a condensing lens 131 to condense the light synthesized by the synthesis unit 120.

The uniform light illumination unit 200 is disposed along a first optical path I to change a propagation direction of the light emitted from the illumination optical system 100 and to cause uniform emitting light to be incident on the display device 301.

The display device 301 selectively transmits or reflects the light passing through the uniform light illumination unit 200 to form the image. The display device 301 may be a reflective-type image forming unit, such as a digital micromirror device (DMD) or a liquid crystal on silicon (LCOS) device, which forms an image by selectively reflecting pixels of incident light. Alternatively, the display device 301 may be a transmission-type image forming unit, such as a transmission-type liquid crystal display (LCD) device, which forms an image by selectively transmitting pixels of incident light. The display device 301 illustrated in FIG. 2 is a reflective-type image forming unit. In this case, a reflecting mirror 305 may be disposed between the display device 301 and the projection optical system 400. The reflecting mirror 305 reflects the light emitted from the uniform light illumination unit 200 to be directed toward the display device 301. The reflecting mirror 305 may be eccentric with respect to a second optical path II.

Although the display device 301 illustrated in FIG. 2 is the reflective-type image forming unit, a transmission-type image forming unit may also be used with the present general inventive concept.

The projection optical system 400 is disposed along the second optical path II to enlarge and project the image formed by the display device 301 onto the screen 450. In order to minimize a space occupied by the projection-type image display device according to the present general inventive concept, the first optical path I and the second optical path II are parallel or substantially parallel to each other. Here, the first optical path I substantially intersects, at a right angle, an axis (incident light axis) of the light emitted from the illumination optical system 100. The uniform light illumination unit 200 disposed along the first optical path I may have various configurations as described below.

The uniform light illumination unit 200 may include first and second reflecting mirrors 221 and 225, and a glass rod 210 disposed between the first and second reflecting mirrors 221 and 225.

The first reflecting mirror 221 is obliquely disposed along the first optical path I to reflect the light, which is synthesized by the illumination optical system 100 and propagates along the incident light axis, to be directed toward the first optical path I.

The glass rod 210 is disposed along the first optical path I and includes an entrance surface 211 through which light enters and an exit surface 215 through which light exits. The glass rod 210 has a rectangular shape having a length between the entrance surface 211 and the exit surface 215 that is greater than a diagonal length of the entrance surface 211. Since the glass rod 210 has a refractive index different from that of a surrounding medium, the glass rod 210 causes light, which is incident thereinto at a predetermined angle, to be totally internally reflected. Here, the refractive index of the glass rod 210 is greater than the refractive index of the surrounding medium (e.g., air). Accordingly, the total internal reflection of the glass rod 210 due to the refractive index difference between the glass rod 210 and the surrounding medium occurs when light is incident on an inner sidewall of the glass rod 210 at an angle greater than a critical angle. The light passing through the glass rod 210 is made uniform by the total internal reflection.

The second reflecting mirror 225 is obliquely disposed along the first optical path I adjacent to the exit surface 215. The second reflecting mirror 225 reflects the light emitted from the glass rod 210 to be directed toward the display device 301.

Since the uniform light illumination unit 200 includes the glass rod 210 and the first and second reflecting mirrors 221 and 225 to change the path of light, a longitudinal direction of the glass rod 210 can be arranged perpendicular with respect to the incident light axis. Accordingly, the projection-type image display apparatus according to the present general inventive concept can have a width smaller than that of the conventional projection-type image display apparatus illustrated in FIG. 1. Further, the projection-type image display apparatus can be made more compact with the same elements as the conventional projection-type image display apparatus.

Figure 3:
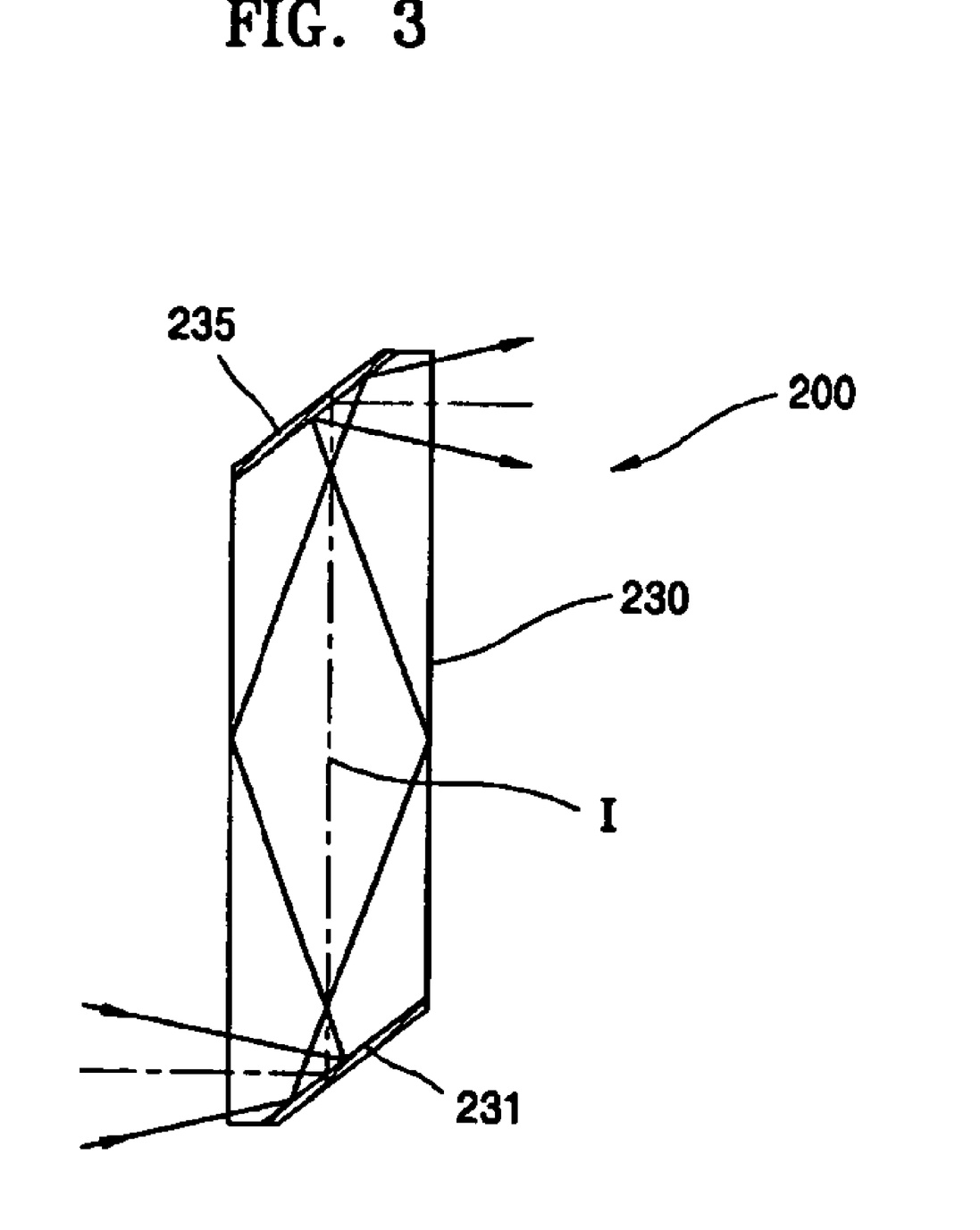
FIG. 3 is a schematic diagram illustrating a uniform light illumination unit used with the projection-type image display apparatus of FIG. 2 according to another embodiment of the present general inventive concept.

The uniform light illumination unit 200 may alternatively have a configuration as illustrated in FIG. 3. Referring to FIG. 3, the uniform light illumination unit 200 according to another embodiment includes a glass rod 230, and first and second reflecting units 231 and 235 integrally formed with ends of the glass rod 230.

The glass rod 230 is disposed along the first optical path I, and causes light incident thereinto at a predetermined angle to be totally internally reflected, because a refractive index of the glass rod 230 is different from that of a surrounding medium. Both ends of the glass rod 230 are different in shape from ends of the glass rod 210 of FIG. 2. However, since other parts of the glass rod 230 are identical with those of the glass rod 210 of FIG. 2, a detailed explanation thereof will not be provided.

The first reflecting unit 231 is integrally formed with a light entrance end of the glass rod 230. That is, the first reflecting unit 231 is slanted at a predetermined angle with respect to a sidewall of the glass rod 230 or the first optical path. The first reflecting unit 231 reflects the light emitted from the illumination optical system 100 to be directed toward an inside of the glass rod 230. The second reflecting unit 235 is integrally formed with a light exit end of the glass rod 230, and is slanted at a predetermined angle with respect to the sidewall of the glass rod 230 or the first optical path. The second reflecting unit 235 reflects the light emitted from the glass rod 230 to be directed toward the display device 301.

Since the uniform light illumination unit 200 includes the glass rod 230 and the first and second reflecting units 231 and 235 that are integrally formed with the glass rod 230 to change the path of light, a longitudinal direction of the glass rod 230 can be arranged perpendicular to the incident light axis.

Figure 4:
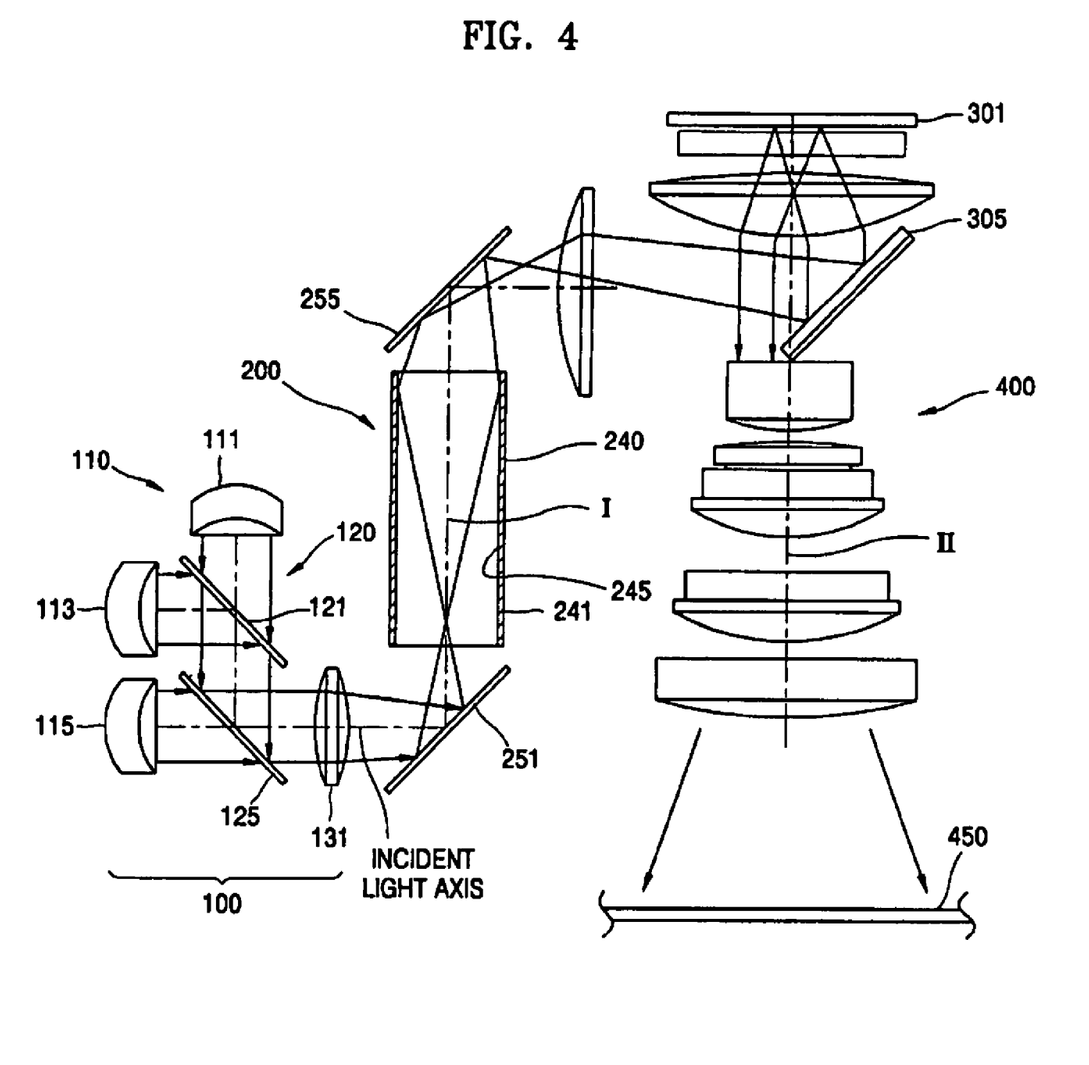
FIG. 4 is a schematic diagram illustrating an optical arrangement of a projection-type image display apparatus according to another embodiment of the present general inventive concept.

Referring to FIG. 4, a projection-type image display apparatus according to another embodiment of the present general inventive concept includes an illumination optical system 100 to emit a beam of a predetermined color, a uniform light illumination unit 200 to change a propagation path of light and to emit uniform light, a display device 301 to form an image from the light emitted from the uniform light illumination unit 200, and a projection optical system 400 to project the image formed by the display device 301 onto a screen 450.

Figure 5:
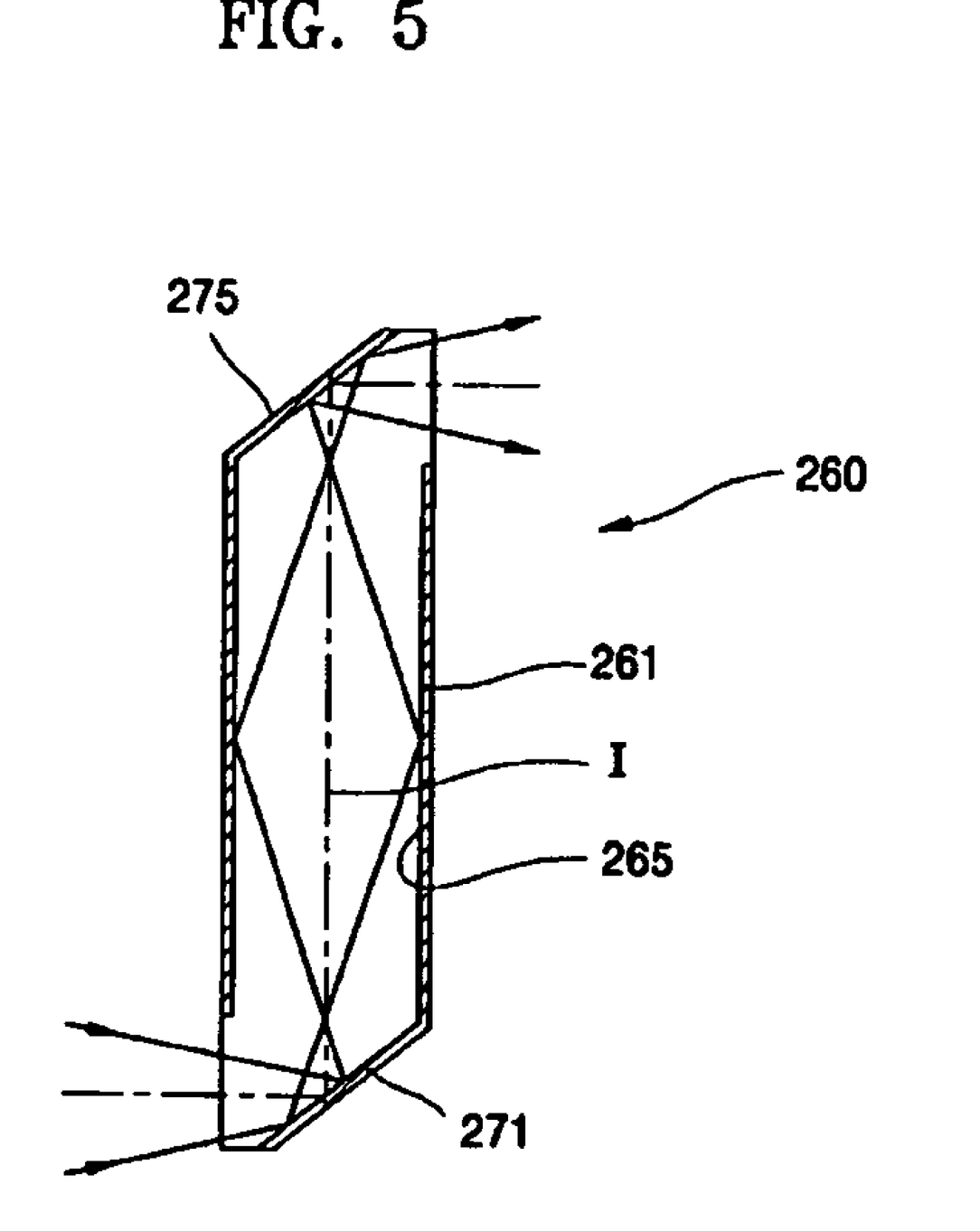
FIG. 5 is a schematic diagram illustrating a uniform light illumination unit used with the projection-type image display apparatus of FIG. 4 according to another embodiment of the present general inventive concept.

The projection-type image display apparatus according to the present embodiment is characterized in that the uniform light illumination unit 200 is constructed as illustrated in FIGS. 4 and 5. Since optical configurations and arrangements of other elements are essentially the same as those of the projection-type image display apparatus illustrated in FIG. 2, a detailed explanation thereof will not be provided.

The uniform light illumination unit 200 includes first and second reflecting mirrors 251 and 255 and an optical tunnel 240 disposed between the first and second reflecting mirrors 251 and 255.

The first reflecting mirror 251 is obliquely disposed along a first optical path I to reflect the light, which is synthesized by the illumination optical system 100 and propagates along an incident light axis, to be directed along the first optical path I. The optical tunnel 240 is disposed along the first optical path I, and includes a hollow tube 241 and a reflecting unit 245 formed along an inner wall of the tube 241. Accordingly, light incident at a predetermined angle on the optical tunnel 240 is totally internally reflected by the reflecting unit 245 and propagates in a scrambled state. Hence, the light passing through the optical tunnel 240 becomes uniform and is different from a beam profile of the incident light. The second reflecting mirror 255 is obliquely disposed along the first optical path I and reflects the light emitted from the optical tunnel 240 to be directed toward the display device 301.

Since the uniform light illumination unit 200 includes the optical tunnel 240 and the first and second reflecting mirrors 251 and 255 to change the path of the incident light, a longitudinal direction of the optical tunnel 240 can be arranged perpendicular to the incident light axis. Accordingly, the projection-type image display apparatus according to the present embodiment can have a width smaller than that of the conventional projection-type image display apparatus illustrated in FIG. 1. Consequently, the projection-type image display apparatus according to the present general inventive concept can be made more compact with the same elements as the conventional projection-type image display apparatus of FIG. 1.

The uniform light illumination unit 200 may alternatively have a configuration as illustrated in FIG. 5. Referring to FIG. 5, the uniform light illumination unit 200 according to another embodiment includes an optical tunnel 260, and first and second reflecting units 271 and 275 integrally formed with ends of the optical tunnel 260.

The optical tunnel 260 is disposed along the first optical path I and includes a hollow tube 261 and a reflecting unit 265 formed along an inner wall of the tube 261. The optical tunnel 260 makes incident light uniform. The first reflecting unit 271 is disposed on an entrance end of the optical tunnel 260 to be slanted at a predetermined angle and reflects the light emitted from the illumination optical system 100 to be directed toward the inside of the tube 261. The second reflecting unit 275 is disposed on an exit end of the optical tunnel 260 to be slanted at a predetermined angle and reflects the light emitted from the optical tunnel 260 to be directed toward the display device 301.

Since the uniform light illumination unit 200 includes the optical tunnel 260 and the first and second reflecting units 271 and 275 integrally formed with the optical tunnel 260, a longitudinal direction of the optical tunnel 260 can be arranged perpendicular with respect to the incident light axis.

As described above, a projection-type image display apparatus is constructed such that a longitudinal direction of a glass rod or an optical tunnel is parallel or substantially parallel to a direction in which a projection optical system is disposed, thereby reducing an overall size of the projection-type image display apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection-type image display apparatus, comprising:
    an illumination optical system including a light emitting diode light source to produce light and to emit the light produced in one direction;
    a uniform light illumination unit disposed along a first segment of an optical path to change a propagation direction of the light emitted from the illumination optical system and to emit uniform light;
    a display device to form an image from the light emitted from the uniform light illumination unit; and
    a projection optical system disposed along a second segment of the optical path to enlarge and project the image formed by the display device onto a screen,
    wherein the first segment of the optical path along which the uniform light illumination unit is disposed and the second segment of the optical path along which the projection optical system is disposed are parallel or substantially parallel to each other.

2. The projection-type image display apparatus of claim 1, wherein the uniform light illumination unit comprises:
    a first reflecting mirror to reflect the light emitted from the illumination optical system to be directed along the first segment of the optical path;
    a glass rod disposed along the first optical path to cause light, which is incident thereinto at a predetermined angle, to be totally internally reflected due to a refractive-index difference between the glass rod and a surrounding medium; and a second reflecting mirror to reflect light emitted from the glass rod to be directed toward the display device.

3. The projection-type image display apparatus of claim 1, wherein the uniform light illumination unit comprises:

a glass rod disposed along the first segment of the optical path to cause light, which is incident thereinto, to be totally internally reflected due to a refractive-index difference between the glass rod and a surrounding medium;

a first reflecting unit integrally formed with a light entrance end of the glass rod to be slanted at a predetermined angle with respect to a sidewall of the glass rod to reflect light emitted from the illumination optical system to be directed toward an inside of the glass rod; and a second reflecting unit integrally formed with a light exit end of the glass rod to be slanted at a predetermined angle with respect to the sidewall of the glass rod to reflect light emitted from the glass rod to be directed toward the display device.

4. The projection-type image display apparatus of claim 1, wherein the uniform light illumination unit comprises:

a first reflecting mirror to reflect light emitted from the illumination optical system to be directed along the first segment of the optical path;

an optical tunnel disposed along the first optical path having a hollow tube and a reflecting unit formed along an inner wall of the tube to make incident light uniform; and a second reflecting mirror to reflect light emitted from the optical tunnel to be directed toward the display device.

5. The projection-type image display apparatus of claim 1, wherein the uniform light illumination unit comprises:

an optical tunnel disposed along the first segment of the optical path having a hollow tube and a reflecting unit formed along an inner wall of the tube to make incident light uniform a first reflecting unit disposed on an entrance end of the optical tunnel to be slanted at a predetermined angle to reflect light emitted from the illumination optical system to be directed toward an inside of the tube; and a second reflecting unit disposed on an exit end of the optical tunnel to be slanted at a predetermined angle to reflect light emitted from the optical tunnel to be directed toward the display device.

6. The projection-type image display apparatus of claim 1, wherein the uniform light illumination unit comprises one of a glass rod and a hollow tube having a length along the first segment of the optical path longer than a diagonal length of a surface through which the light enters into the one of the glass rod and the hollow tube.

7. The projection-type image display apparatus of claim 1, wherein the display device receives the uniform light and emits the image along a display axis parallel to at least one of the first segment of the optical path and the second segment of the optical path.

8. The projection-type image display apparatus of claim 1, wherein a length of the uniform light illumination unit is longer than that of the illumination optical system and shorter than that of the projection optical system with respect to the first segment of the optical path.

9. A projection-type image display apparatus, comprising:
an illumination optical system to emit light;

a uniform light illumination unit disposed along a first optical path to emit uniform light from the light, and having a rod to internally reflect the light along a length of the rod a display unit disposed at a first end of a second optical path to receive the uniform light from the uniform light illumination unit and emit an image by one of selectively reflecting the uniform light and selectively transmitting the uniform light; and a projection optical system having image processing optics disposed along the second optical path substantially parallel to the first optical path to process the image produced by the display unit, to enlarge the image, and to project the enlarged image onto a screen.

10. The apparatus of claim 9, wherein the illumination optical system emits the light along an incident axis and the incident axis is substantially perpendicular with respect to the first optical path.

11. The apparatus of claim 10, wherein the illumination optical system produces one or more light beams of different wavelengths, combines the one or more light beams, and emits the combined one or more light beams along the incident axis.

12. The apparatus of claim 10, wherein the uniform light illumination unit comprises:

a first reflector disposed at an angle where the incident axis meets the first optical path to reflect the light from the incident axis toward an inside of the uniform light illumination unit; and a second reflector disposed at an angle at an end of the first optical path opposite the first reflector to reflect the uniform light toward the display unit.

13. The apparatus of claim 9, wherein the rod of the uniform light illumination unit is disposed longitudinally along the first optical path having a refraction index that is greater than a surrounding medium.

14. The apparatus of claim 13, wherein the uniform light illumination unit further comprises:

a first reflector integrally formed with an entrance face of the rod and having a first predetermined angle with respect to the first optical path; and a second reflector integrally formed with an exit face of the rod and having a second predetermined angle with respect to the first optical path.

15. The apparatus of claim 9, further comprising:

at least two propagation direction changing units to change a propagation direction of light within the projection-type image display apparatus.

16. The apparatus of claim 9, wherein the display unit comprises one of a digital micromirror device, a liquid crystal on silicon device, and a transmission-type liquid crystal display device.

17. A projection-type image display apparatus, comprising:

an illumination optical system to emit light;

a uniform light illumination unit disposed along a first optical path to emit uniform light from the light, and having a light tunnel having a hollow tube rod to internally reflect the light along a length of the hollow tube;

a display unit disposed at a first end of a second optical path to receive the uniform light from the uniform light illumination unit and to emit an image by one of selectively reflecting the uniform light and selectively transmitting the uniform light; and a projection optical system having image processing optics disposed along the second optical path substantially parallel to the first optical path to process the image produced by the display unit, to enlarge the image, and to project the enlarged image.

18. The apparatus of claim 17, wherein the light tunnel of the uniform light illumination unit comprises a reflective inner surface to internally reflect the light along the length of the hollow tube.

19. The apparatus of claim 18, wherein the uniform light illumination unit further comprises:

a first reflector formed on an entrance end of the light tunnel and having a first predetermined angle with respect to the first optical path; and a second reflector formed on an exit end of the light tunnel and having a second predetermined angle with respect to the first optical path.

* * * * *